UNITED STATES PATENT OFFICE.

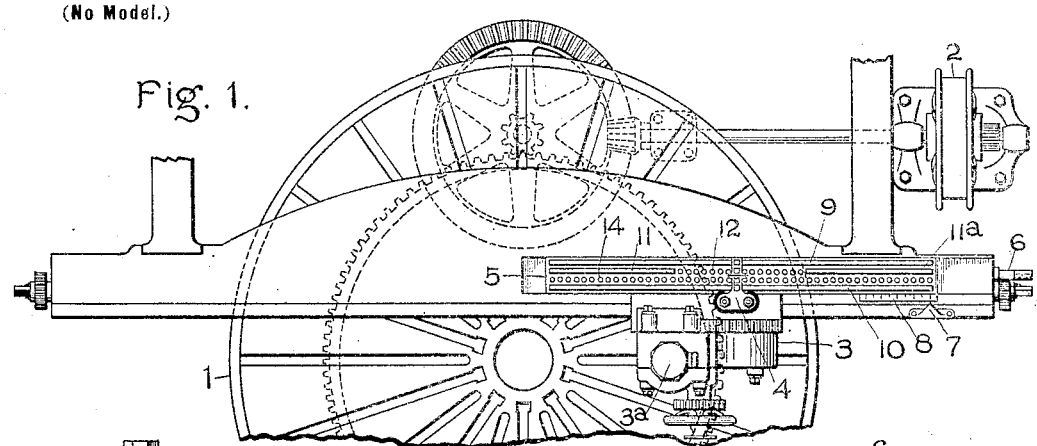

JOHN RIDDELL, OF SCHENECTADY, NEW YORK, ASSIGNOR TO THE GENERAL ELECTRIC COMPANY, OF NEW YORK.

ELECTRICALLY-OPERATED MACHINE-TOOL.

SPECIFICATION forming part of Letters Patent No. 660,801, dated October 30, 1900.

Application filed August 30, 1900. Serial No. 28,572. (No model.)

*To all whom it may concern:*

Be it known that I, JOHN RIDDELL, a citizen of the United States, residing at Schenectady, county of Schenectady, State of New York, have invented certain new and useful Improvements in Electrically-Operated Machine-Tools, (Case No. 1,506,) of which the following is a specification.

This invention relates to electrically-driven tools, the object being to permit the tool to be driven at a variable rate of speed without necessity of changing the gearing.

In working large pieces in a lathe much time is lost in change of speed at the point on which the tool is working as it moves inwardly toward or outwardly from the center, since if the tool cuts rapidly on outer parts of the work it must cut very slowly when it gets near the center, as the circle over which it travels is of much less diameter, and if changeable gearing is provided for effecting a change of speed considerable time is lost in adjusting the machine. On the other hand, if a hand-rheostat is used constant attention of the operator is required. In large boring and turning mills this is particularly evident where the cutting-tool may have a range of motion of ten or fifteen feet. Obviously unless means are provided for changing the relative rate of travel of the tool and the work a very slow rate of cutting will be effected on the central parts of the work.

It is the object of my invention to automatically adjust the conditions so that the tool may be given a continuous and uniform rate of travel with relation to the work. I effect this result by driving the machine by an electric motor and automatically changing the motor connections as the cutting-tool travels over the work, so that a uniform rate of cutting will be maintained on all parts of the work.

My invention is applicable to all types of tools in which a relative rotation of the tool and work is effected—such as lathes, boring and turning mills, &c.—means being provided for automatically increasing the speed of the motor as the cutting proceeds from the center outward, and vice versa.

The novel features of my invention will be more fully hereinafter described and will be definitely indicated in the claims appended to this specification.

In the accompanying drawings, which illustrate my invention as applied to a boring and turning mill, Figure 1 is a plan view of an organization embodying my improvements. Fig. 2 is a side elevation. Fig. 3 is an enlarged detail of the cutter-head and guide or cross-slide, and Fig. 4 is a diagram showing one form of control-circuits and mechanism for effecting the necessary changes of motor speed.

1 represents a turn-table or revolving support for the work, which is geared to the shaft of an electric motor 2, as will be clearly evident from Figs. 1 and 2.

3 represents a cutter-head in which an adjustable cutter-bar $3^a$ for the cutting-tool $3^b$ is mounted. This tool is provided with gearing by which it may be hand-operated or driven by the same source of power which rotates the bed 1, means being provided for moving the tool vertically or horizontally, according to the character of the cut desired. As tools of this character are of usual construction and are well known to those familiar with the construction of machine-tools, I deem it unnecessary to describe its parts in detail, the drawings representing the operative parts of the tools simply to exemplify the application of my speed-controlling apparatus.

I mount on the cutter-head a contact device which as it moves to and fro with relation to the work automatically changes the voltage on the field and armature of the driving electric motor, either or both, to maintain a uniform cutting rate. This contact device is illustrated at 4 (see Figs. 1 and 4) and comprises two bridging contacts insulated from one another, one of which varies the electromotive force on the armature of the motor and the other on the field, both bearing in the travel of the cutter-head upon a slide 5, upon which are mounted rail conductors and contacts for effecting the necessary changes of voltage. This slide is mounted on a fixed part of the machine, as the cross-slide, but is adjustable with relation to the line of travel of the cutter-head, as indicated in Fig. 1, means being provided for shifting it to a desired position of adjustment—for example, as indicated in Fig. 2, a screw 6, having a squared end to receive a wrench by which the voltage-changing slide 5 may be longitudinally shifted. On a fixed part of the cross-slide is an index 7, opposite which is a scale 8, carried by the contact-slide 5 for indicating the condition of adjustment. The arrangement of the controlling-circuit for the driving-motor will be clearly understood from a consideration of Fig. 4. At 9 and 10 are shown continuous metallic rails mounted on the contact-slide, which latter may be made of wood or other insulating material, one rail being connected by a wire with one of the outside wires of a three-wire system and the other with one of the motor-terminals, the other motor-terminal being connected with the other outside wire of the system. 11 and 11ª represent shorter rails, both in the path of the contact device which controls the armature-circuit.

I have shown an organization adapted for use on a three-wire Edison system. It will be apparent, however, that the principle involved in my invention may be applied in other ways, which will be obvious to electricians, the essential feature being that as the tool is shifted with relation to the work connections are automatically effected by which the speed of the motor is suitably changed to maintain a constant rate of work.

I make no claim herein to the specific form of controller illustrated in Fig. 4, that being the invention of another.

12 represents a range of contacts connecting with different points of a resistance 13, governing the armature-circuit, and 14 represents a range of contacts connecting with resistances 15 and 15ª for governing the strength of field magnetism in the motor. The range of contacts (marked 12) is placed between the rails 11 11ª and at uniform distance from the rail 9, so that the contacts and the rail 9 may be successively bridged as the cutter-head moves between the rails 11 11ª. Similarly the range of contacts 14 are mounted at equal distances from the rail 10, so that they may be successively connected with the rail by the bridging contact 4ª, carried by the cutter-head. The resistance 15ª is tapped at different points of its length by leads connecting with a group of the contacts 14, similar connections being led to an adjoining group of contacts, so that as the brushes move along the range of contacts the resistance may be first cut into the field and then gradually cut out. A further range of movement again cuts in sections of the resistance 15, the result of these changes being to first weaken the field, then strengthen it, and then again weaken it. Simultaneously with these changes the bridging contact 4ᵇ, which controls the armature-circuit, is moving first over the rail 11ª, then over the range of contacts 12, and then over rail 11. One terminal of the motor-armature is on the positive main a of the system and the other terminal on the rail 9. The rail 11ª is on the neutral wire b of the system, being connected thereto by a lead 16. One terminal of the resistance 13 connects with the extreme right contact of the range 12, and the other terminal of the resistance connects with the rail 11, which in turn connects by a lead 17 with the negative main c of the system. With this arrangement it will be evident that when the cutter-head is shifted to the extreme right in the diagram the armature will be connected by the bridging contact 4ᵇ, between mains a and b, by means of the connecting-wire 16, rail 11ª, bridging contact 4ᵇ, and wire 18 to main a. Assuming that the potential between the mains a and b is one hundred and twenty-five volts and that between a and c is two hundred and fifty volts, the armature will now have a potential of one hundred and twenty-five volts. The field-magnet is at the same time connected across the outside mains a and c without any resistance in circuit, the circuit being from main a by wire 19 through the field-magnet, by wire 20 to the extreme right-hand contact of the range 14, thence by the bridging contact 4ª to the rail 10, and thence by wire 17 to the main c. The armature in this condition of adjustment will take a minimum speed, turning in a dense field under a minimum voltage. Assuming that the cutter-head is moving from the center of the work toward its periphery, its motion in the diagram would be from right to left, during which the range of contacts 14 would be successively bridged and the resistance 15ª gradually cut into the field-circuit. The armature voltage is unaffected until the bridging contact leaves the rail 11ª. During this time the introduction of resistance into the field-magnet circuit cuts down the strength of the field and permits the motor to accelerate in speed. When the cutter-head shifts to a point where the bridging contact 4ᵇ is carried off the rail 11ª, the armature is connected across the outside mains a and c through the resistance 13. Thus the potential on the armature is increased, still further increasing its speed. As the cutter-head shifts to the left the field is strengthened during the increase of voltage on the armature by gradually cutting in the resistance 15ª until the contact corresponding to the end of the resistance 15 is reached, at which time the full voltage of two hundred and fifty is put upon the armature by means of the bridging contact 4ᵇ engaging the rail 11, and the field-coils at the same time have an impressed voltage of two hundred and fifty, the circuit being by way of wires 19 and 20, wire 21, contact 14ª, bridging contact 4ª, rail 10, and conductor 17. A further movement of the cutter-head to the left gradually cuts in the resistance 15, thereby decreasing the field-magnet strength and permitting the motor to take a higher speed, until at the extreme left-hand limit the armature is under a maximum voltage and the field-magnets have minimum strength. Thus it will be seen that a finely-graduated speed variation is provided and that the motor keeps the tool increasing or decreasing its rate of travel relatively to the work as the radius of cutting decreases or increases, respectively, thus maintaining a constant cutting speed. This speed itself may be increased or decreased by adjusting the slide 5, upon which the contacts are carried, an outward shifting of the slide increasing the speed of cutting and an inward shifting decreasing the same, since it is evident that if the slide is pulled out a higher voltage is imposed upon the armature and the speed of the motor accordingly increased.

What I claim as new, and desire to secure by Letters Patent of the United States, is—

1. The combination with a machine-tool, of a driving electric motor and means for automatically varying the speed of the motor to control the speed of the tool.

2. The combination with a machine-tool, of a driving electric motor, a speed-controller for the motor, and mechanical connections with the machine for operating the controller.

3. The combination with a machine-tool, of a driving electric motor, a speed-controller for the motor, and connections for operating the controller to vary the motor speed as the cutting shifts to or from the center of the work.

4. The combination with a turning-mill or similar machine-tool, of a driving electric motor, a speed-controller for the motor, and mechanical connections for operating the controller as the cutter moves to and from the center of the work.

5. The combination with a turning-mill or similar machine-tool, of a driving electric motor, a speed-controller, and connections for varying the voltage on the field-magnet and armature of the motor as the cutting-tool shifts to and from the center of the work.

6. The combination with a turning-mill or similar machine-tool, of a driving electric motor, a speed-controller for the motor, and connections for raising the voltage on the motor as the cutting-tool shifts toward the center of the work.

7. The combination with a turning-mill or similar machine-tool, of a driving electric motor, a resistance in the motor-circuit, and a contact device to automatically reduce the resistance as the cutting-tool moves toward the center of the work.

8. The combination with a turning-mill or similar machine-tool, of a driving electric motor, a speed-controller therefor comprising a variable resistance and connections for cutting out resistance to raise the motor speed and maintain a uniform rate of cutting as the tool shifts toward the center of the work, and vice versa.

9. The combination with a turning-mill or similar machine-tool, of a driving electric motor, speed-controlling resistance in the field-magnet and armature-circuit of the motor, and contacts governed by the mill for varying said resistance to maintain a uniform cutting rate as the cutting-tool shifts to different parts of the work.

10. The combination of a turning-mill or similar machine-tool, of an electric motor, a supply-circuit delivering different voltages, and connections for automatically changing the leads connecting the motor and mains as the cutting-tool shifts to or from the center of the work.

11. The combination of a turning-mill or similar machine-tool, of a driving electric motor, fixed speed-controlling contacts mounted on a stationary part of the mill, and a movable contact device operated by the mill to vary the speed of the motor.

12. The combination of a turning-mill or similar machine-tool, of a driving electric motor, a range of speed-controlling contacts, a relatively-movable contact device operated by the mill to vary the speed of the motor, and means for adjusting the starting-point of the contact device relatively to the range of contacts.

13. The combination of a turning-mill or similar machine-tool, of a driving electric motor, a range of speed-controlling contacts for the motor, connections with the field-magnet and armature-circuits of the motor, a supply-circuit for delivering a plurality of voltages, and a contact device operated by the mill for gradually varying the voltages on the armature and field to accelerate the motor speed as the cutting-tool moves toward the center of the work.

14. The combination of a turning-mill or other machine-tool, of a driving electric motor, rheostatic contacts mounted on the cross-slide connecting respectively with the field-magnet and armature-circuits of the motor, and insulated contacts carried by the cutter-head for engaging the rheostatic contacts consecutively and varying the motor speed as the cutting-tool shifts over the work to maintain uniform the rate of cutting.

In witness whereof I have hereunto set my hand this 29th day of August, 1900.

JOHN RIDDELL.

Witnesses:
BENJAMIN B. HULL,
EDWARD WILLIAMS, Jr.